United States Patent
Luffel et al.

(10) Patent No.: US 6,222,699 B1
(45) Date of Patent: Apr. 24, 2001

(54) MODULAR DATA STORAGE SYSTEM UTILIZING A WIRELESS CARTRIDGE ACCESS DEVICE

(75) Inventors: Robert W. Luffel, Greeley; Gregg S. Schmidtke, Fort Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/321,142

(22) Filed: May 27, 1999

Related U.S. Application Data

(63) Continuation-in-part of application No. 09/143,208, filed on Aug. 28, 1998.

(51) Int. Cl.⁷ ................................................. G11B 15/68
(52) U.S. Cl. ............................................................. 360/92
(58) Field of Search .............................. 360/92; 369/36; 414/280; 439/110–122, 207–216

(56) References Cited

U.S. PATENT DOCUMENTS

| | | | |
|---|---|---|---|
| 5,303,214 | * | 4/1994 | Kulakowski et al. ................... 369/34 |
| 5,791,853 | * | 8/1998 | Danielson et al. ..................... 414/280 |
| 6,061,607 | * | 5/2000 | Bradley et al. ........................ 700/216 |

* cited by examiner

Primary Examiner—George J. Letscher

(57) ABSTRACT

A modular data storage system for handling and storing data cartridges which may comprise a plurality of modular units which are attachable to one another to form adjacent modular units. Conductive track members extend laterally across the modular units. The modular data storage system may further comprise at least one wireless cartridge access device for receiving a cartridge and transferring it to another location. The system may further comprise at least one modular corner unit which is attachable to modular units at each end thereof. The adjacent modular units and corner unit(s) may be stacked vertically upon one another to form a plurality of levels of adjacent modular units. At least one of the modular units may comprise a cartridge-receiving module, a power module which supplies electrical current to the conductive track members, a service module adapted to receive and provide access to a cartridge access device in order to service the cartridge access device, a control module which communicates with the cartridge access device via a wireless signal, or an elevator module adapted to vertically translate the cartridge access device among the levels of adjacent modular units. The modular data storage system may be arranged in a closed geometric configuration and comprise at least one access door thereto. The system may further comprise an upper panel and a lower panel, forming a completely enclosed area that is accessible through the access door(s).

20 Claims, 7 Drawing Sheets

MODULAR DATA STORAGE SYSTEM UTILIZING A WIRELESS CARTRIDGE ACCESS DEVICE

The present application is a continuation-in-part of U.S. patent application Ser. No. 09/143,208 filed Aug. 28, 1998 pending for SYSTEM AND METHOD FOR PROVIDING POWER AND CONTROL SIGNALS TO A CARTRIDGE ACCESS DEVICE IN A CARTRIDGE STORAGE SYSTEM of Gregg S. Schmidtke (hereinafter referred to as '208), which is hereby specifically incorporated by reference for all that is disclosed therein.

FIELD OF THE INVENTION

The present invention relates generally to data storage systems for storing and accessing data storage media devices such as data cartridges, and more particularly to a data storage system comprised of individual modular units and utilizing a wireless cartridge access device.

BACKGROUND OF THE INVENTION

Many different types of data storage systems exist and are being used to store data storage media devices at known locations and to retrieve such devices so that data may be written to and/or read from them. Such data storage media devices may include tapes, "floppy" or "hard" disks, optical disks, videotape, microfilm, and the like, which are oftentimes encased in a housing or "cartridge". For purposes of the present application, the term "cartridge" is defined as a movable unit of equipment designed to fit into a larger piece of equipment, and includes but is not limited to any device used to store data.

Data storage systems are often referred to as "autochangers" or "juke box" data storage systems, particularly if they accommodate a large number of individual data cartridges. A typical juke box data storage system includes one or more different types of cartridge-receiving devices for holding the various data cartridges. For example, one type of cartridge-receiving device may comprise a cartridge storage rack or "magazine" while another type of cartridge-receiving device may comprise a cartridge read/write device or "drive". Data storage systems typically also include a cartridge access device for retrieving the cartridges and transporting them to various places within the system.

Data storage systems may be produced in a variety of sizes and configurations. In order to establish a product definition, a data storage system manufacturer may survey potential customers as to their specific needs. The manufacturer may then design a "point" product around this definition. This process may be repeated for different types of customers which are typically classified as "low-end", "mid-range" or "high-end" customers ("low-end" customers requiring a more cost-competitive, smaller capacity library than "mid-range" or "high-end" customers).

Although products of several different sizes may be produced, the capacity of each of these products is limited. In other words, within any particular data storage system produced by a manufacturer there is a specific number of cartridge-receiving devices and cartridge access device(s). This limits the options for a customer whose needs change and who may require a larger data storage system at some point in the future. Specifically, that customer can either purchase another data storage system to use along with their original data storage system, or that customer can purchase a new, larger-capacity data storage system to replace the original one. While the former option involves less initial cost than the latter, there are several disadvantages for the customer to utilize multiple data storage systems rather than purchase a single, larger system. Specifically, each data storage system has its own cartridge access device and cartridge-receiving devices. There is an unnecessary duplication of components: i.e., the customer needing an upgrade may require more magazines, more drives, or an extra cartridge access device, but not all of these devices in a separate data storage system. Furthermore, the magazines and drives from the first data storage system are not accessible by the cartridge access device of the second data storage system, and vice-versa. The disadvantages of simply purchasing a larger system include the cost of making such a purchase, having to transfer all of the cartridges from the old system to the new system, and having to set up and configure the new system to the customer's satisfaction.

It would be much more desirable for a data storage system to be comprised of individual modular units that can be combined to form data storage systems of varying size and capacity. Ideally, this modular data storage system would utilize one or more wireless cartridge access devices such as that described in '208. A cartridge access device in a typical data storage system is connected via cables to power and signal control sources. The length and position of these cables limit the areas to which the cartridge access device may be translated within a data storage system. The existence of cables also limits the number of cartridge access devices which may be utilized within a system since the cables of multiple cartridge access device may become entangled. Utilizing a wireless cartridge access device eliminates the need for carrying power and signal control devices and cables therefor along with the cartridge access device while it is being translated throughout the system. As a result, a plurality of cartridge access devices may be utilized within the system, and the areas to which each cartridge access device may be translated is greatly increased, only being limited by the range of the wireless signals.

SUMMARY OF THE INVENTION

The present invention is directed to a modular data storage system for handling and storing cartridges. The modular data storage system may comprise a plurality of modular units which are attachable to one another to form adjacent modular units. At least two conductive track members having a voltage potential therebetween extend laterally across each of the modular units. The modular data storage system may further comprise at least one cartridge access device for receiving a cartridge and transferring it to another location. The cartridge access device is preferably adapted to receive a wireless signal and has at least two conductive engaging members which are adapted to contact the conductive track members and provide electrical power to the cartridge access device. The conductive track members are in electrical contact with one another and are substantially in alignment and positioned adjacent one another such that each of the conductive engaging members remains in contact with at least one of the conductive track members as the cartridge access device is translated laterally among the adjacent modular units.

The modular units may further comprise a plurality of gear racks extending laterally across the modular units. The cartridge access device may have at least one pinion gear attached thereto which is adapted to engage the gear racks. The gear racks are substantially in alignment and positioned adjacent one another such that the cartridge access device may be translated laterally among the adjacent modular units.

The system may further comprise at least one modular corner unit which is attachable to modular units at each end thereof whereby the modular units attached thereto are in a non-parallel orientation. The adjacent modular units and corner unit(s) may be stacked vertically upon one another to form a plurality of levels of adjacent modular units. In one embodiment of the present invention, each of the levels of adjacent modular units comprises at least one cartridge access device.

At least one of the modular units may comprise a cartridge-receiving module, a power module which supplies electrical current to the conductive track members, a service module adapted to receive and provide access to a cartridge access device in order to service the cartridge access device, a control module adapted to communicate with the cartridge access device via a wireless signal, or an elevator module adapted to vertically translate the cartridge access device among the levels of adjacent modular units.

The modular data storage system may be arranged in a closed geometric configuration and comprise at least one access door thereto. The system may further comprise an upper panel and a lower panel, forming a completely enclosed area that is accessible through the access door(s).

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
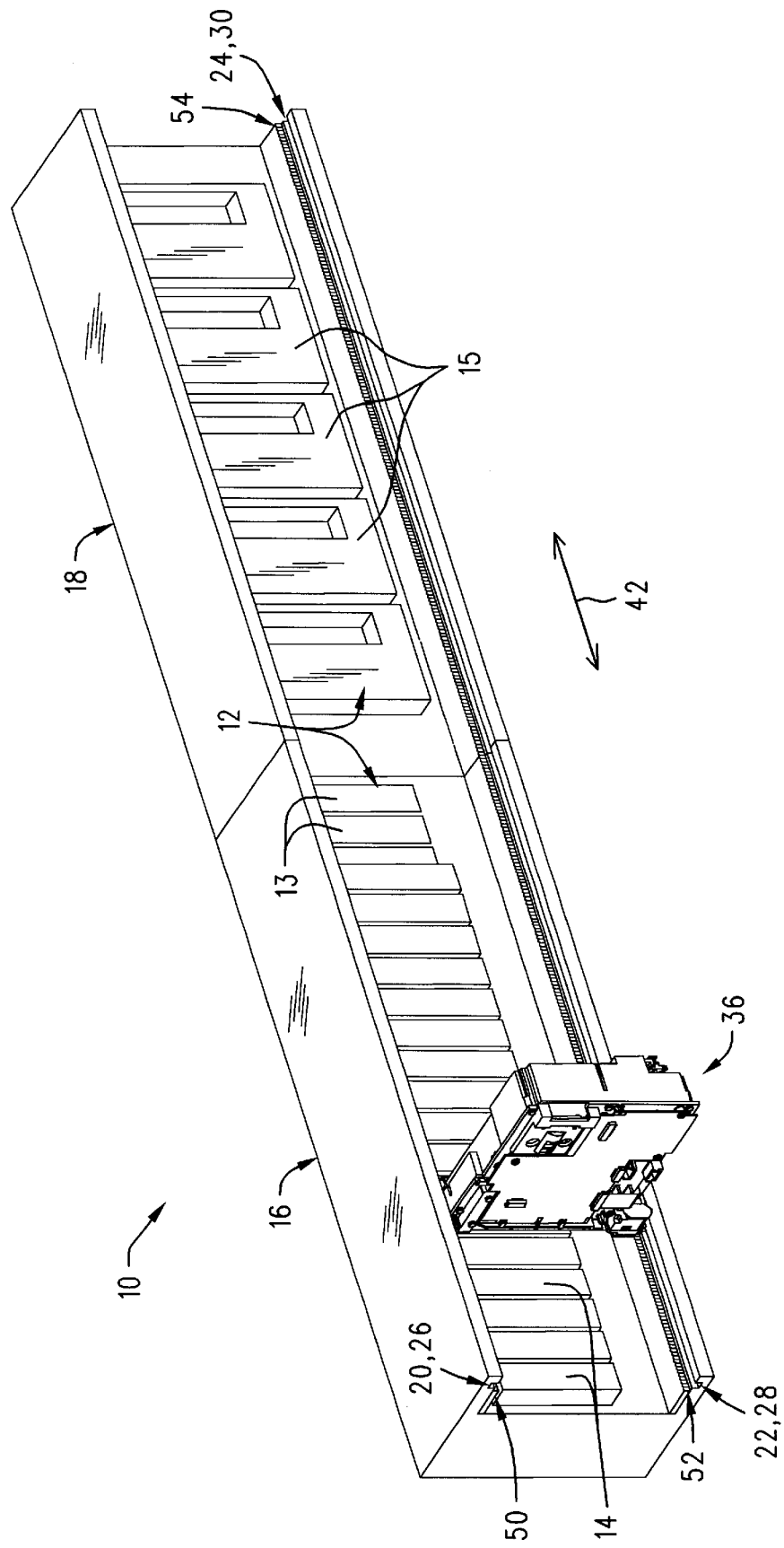
FIG. 1 is an isometric view of a single-level modular data storage system according to the present invention.

A single-level modular data storage system 10 according to the present invention is shown in FIG. 1. The system 10 comprises a plurality of modular units 16, 18 which are attachable to one another to form adjacent modular units. It is to be understood that the following description of modular units 16, 18 applies equally to any modular unit utilized within any embodiment of the system 10. The system 10 may also comprise at least one cartridge access device 36, FIGS. 1 and 2, adapted to retrieve a cartridge 14 and transfer it to another location. Each cartridge access device 36 utilized within the system is preferably of the type described in '208, i.e., the cartridge access device 36 is adapted to receive a wireless signal.

Figure 2:
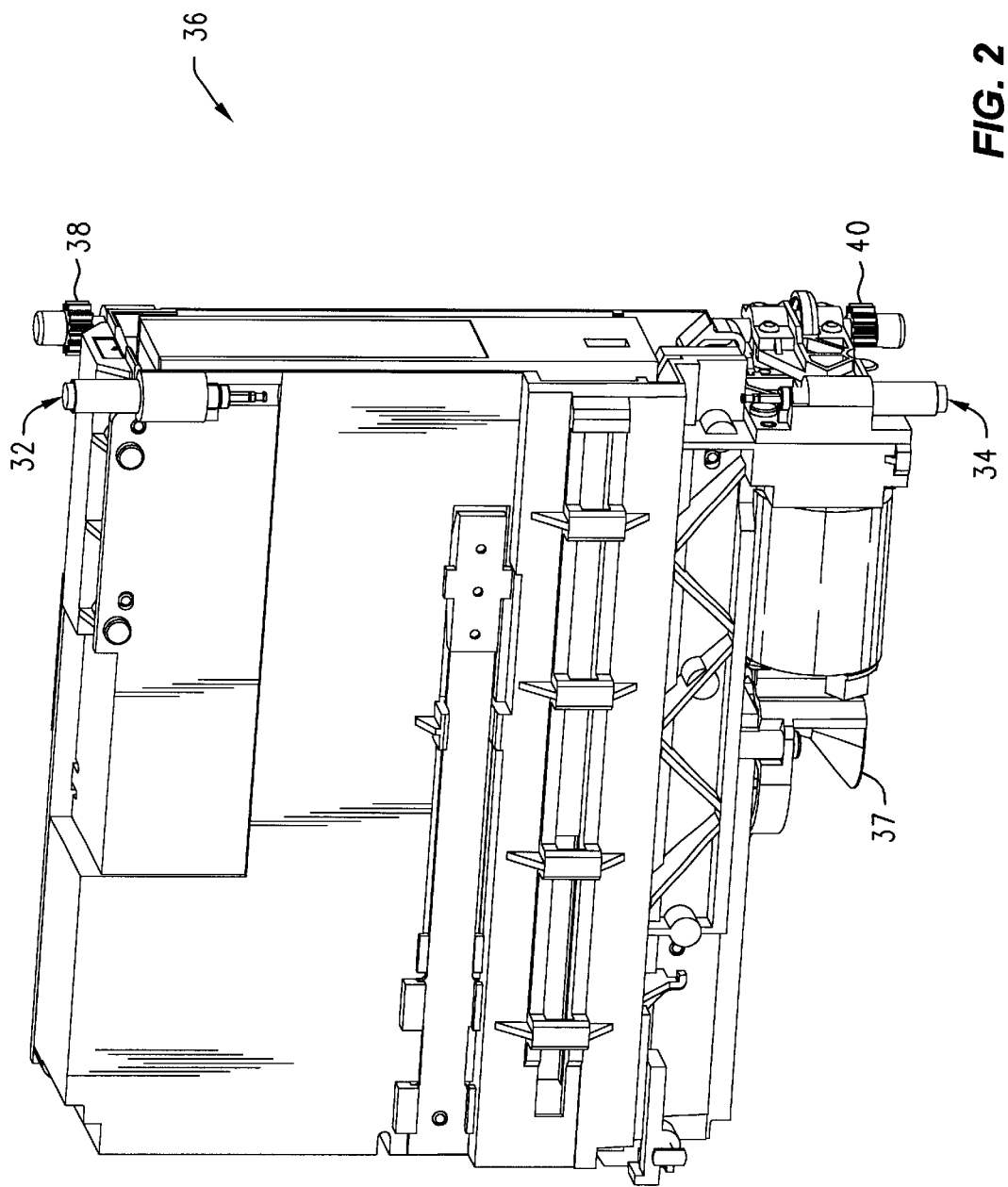
FIG. 2 is an isometric view of a cartridge access device of the modular data storage system of FIG. 1.

As shown in FIG. 1, at least two conductive track members 20, 22, 24 (or "power track" as described in '208) extends laterally across each of the modular units 16, 18. Preferably, each modular unit, e.g., 16, comprises an upper conductive track member 20 and an identical lower conductive track member 22 with a voltage potential therebetween. As described in '208, the upper conductive track member 20 may be configured to maintain a power voltage, while the lower conductive track member 22 may be configured to maintain a ground voltage, or vice-versa. Otherwise, the conductive track members 20, 22, 24 may be identical. The phrase "conductive track member(s)" will hereinafter refer to either the upper or the lower conductive track member(s). Referring to FIGS. 1 and 2, the cartridge access device 36 preferably comprises at least two conductive engaging members 32, 34 (FIG. 2) adapted to contact the conductive track members 20, 22, 24 and provide electrical power to the cartridge access device 36. Each of the conductive engaging members 32, 34 may comprise a brush coupled to a rod as described in '208. Preferably, the cartridge access device 36 comprises an upper conductive engaging member 32 that contacts the upper conductive track members (e.g., 20) and an identical lower conductive engaging member 34 that contacts the lower conductive track members 22, 24. The phrase "conductive engaging member" will hereinafter refer to either the upper or the lower conductive engaging member. The conductive track members 20, 22, 24 may be located within channels 26, 28, 30 within each modular unit 16, 18, as shown in FIG. 1 and described in '208. The conductive track members (e.g., 22, 24) of adjacent modular units 16, 18 are in electrical contact with one another and are substantially in alignment and positioned adjacent one another such that each of the conductive engaging members (e.g., 34) of the cartridge access device 36 remains in contact with at least one of the conductive track members 22, 24 as the cartridge access device 36 is translated laterally 42 among the adjacent modular units 16, 18. The cartridge access device 36 preferably further comprises a communications device 37, which may be a conical device as shown in FIG. 2 and described in '208, mounted on the cartridge access device 36 which is configured to receive a wireless signal from a control module (246, FIG. 5, described in further detail below).

The modular units 16, 18, FIG. 1, may also comprise a plurality of gear racks 50, 52, 54 wherein at least one gear rack extends laterally across each of the modular units 16, 18. Preferably, each modular unit, e.g., 16, comprises an upper gear rack 50 and an identical lower gear rack 52. The phrase "gear rack(s)" will hereinafter refer to either the upper or the lower gear rack(s). Referring to FIGS. 1 and 2, the cartridge access device 36 may comprise at least one pinion gear 38, 40 (FIG. 2) attached to the cartridge access device 36 which is adapted to engage the gear racks 50, 52, 54. Preferably, the cartridge access device 36 comprises an upper pinion gear 38 that contacts the upper gear racks (e.g., 50) and an identical lower pinion gear 40 that contacts the lower gear racks 52, 54. The phrase "pinion gear" will hereinafter refer to either the upper or the lower pinion gear. The gear racks (e.g., 52, 54) of adjacent modular units 16, 18 are substantially in alignment and positioned adjacent one another such that the cartridge access device 36 may be translated laterally among the adjacent modular units 16, 18.

Each of the modular units 16, 18 may comprise one or more modules, such as the cartridge-receiving modules 12 shown in FIG. 1. More than one module may be integrated into a single modular unit 16, 18. The cartridge-receiving modules 12 shown in FIG. 1 comprise cartridge-receiving devices such as cartridge storage racks (magazines) 13 and cartridge read/write devices (drives) 15. Another type of module which may be utilized within a system 10 is a power module (not shown) which supplies electrical current to the conductive track members 20, 22, 24, and may also supply power to other components of the system such as the cartridge read/write devices 15. For this reason, the power module may be integrated into the same modular unit as the cartridge read/write devices 15.

Other types of modules, which will each be described in further detail below, may be utilized within a system 10. A control module (246, FIG. 5) is adapted to communicate with the cartridge access device(s) via a wireless signal in order to control the movements of the cartridge access device(s). An elevator module (110, FIG. 3) is adapted to receive a cartridge access device and vertically translate the cartridge access device among a plurality of levels of adjacent modular units. A service module (250, FIG. 5) is adapted to receive a cartridge access device and provide access thereto by a human, robot, mechanical device, etc., in order to service the cartridge access device. A mailslot module (258, FIG. 5) may be adapted to receive a cartridge in order to add it or take it away from the system.

Figure 3:
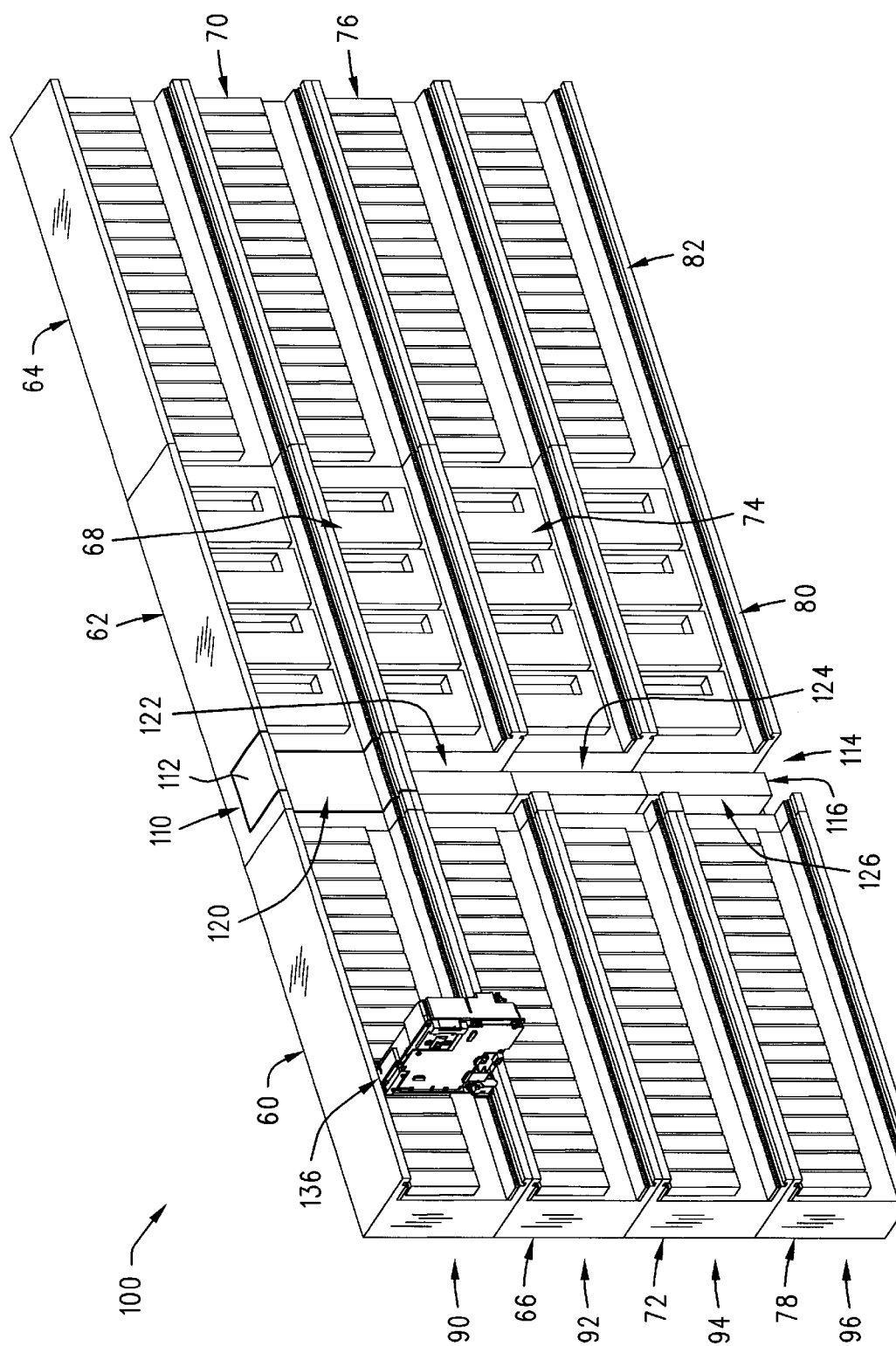
FIG. 3 is an isometric view of a multi-level modular data storage system according to the present invention.

FIG. 3 shows a modular data storage system 100 wherein adjacent modular units 60, 62, 64 are stacked vertically upon adjacent modular units 66, 68, 70; adjacent modular units 66, 68, 70 are stacked vertically upon adjacent modular units 72, 74, 76; and adjacent modular units 72, 74, 76 are stacked vertically upon adjacent modular units 78, 80, 82 to form a plurality of levels 90, 92, 94, 96 of adjacent modular units. While four levels of adjacent modular units are shown in FIG. 3, it is to be understood that any number of levels of adjacent modular units may be utilized within a modular data storage system. It is also to be understood that a single modular data storage system may comprise a variety of levels, i.e., the system could comprise three levels of one type of modular unit, five levels of another type of modular unit, etc.

The system 100 of FIG. 3 includes at least one cartridge access device 136. If a multi-level system such as that shown in FIG. 3 does not comprise at least one cartridge access device 136 on each level 90, 92, 94, 96, the system must include at least one elevator module 110. The elevator module 110 extends along each of the levels 90, 92, 94, 96 and may comprise a lift mechanism 112 which is adapted to receive the cartridge access device 136 and vertically translate the cartridge access device among the plurality of levels 90, 92, etc. The lift mechanism 112 may be controlled by the computer system described in '208 via a wireless communications link. For example, the lift mechanism 112 may comprise a communications device (not shown) which is configured to receive a wireless signal. The elevator module 110 may further comprise a shaft 114 sized and shaped to allow the lift mechanism 112 to pass therethrough, and a guide rail 116 adapted to vertically guide the lift mechanism 112. To maintain maximum flexibility, the shaft 114 and the guide rail 116 may be divided into modular sections 120, 122, 124, 126 which may each be integrated into modular units (e.g., 62, 68, 74, 80, respectively) with other modules such as cartridge-receiving modules as shown in FIG. 3. Alternatively, each of the modular sections 120, 122, 124, 126 may be incorporated within separate modular units (not shown) which are adapted to attach to other modular units.

Figure 4:
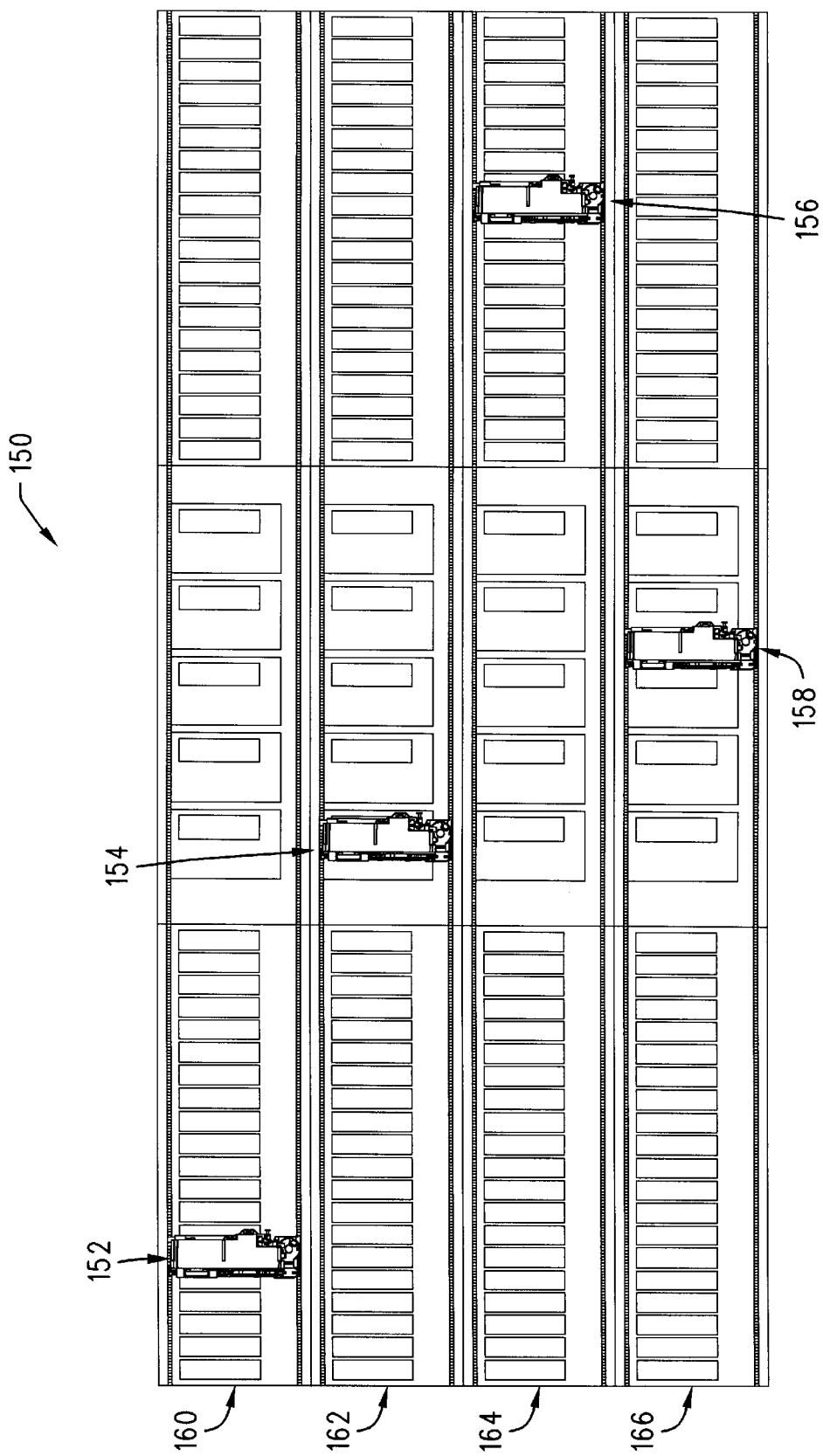
FIG. 4 is a front elevational view of another embodiment of the multi-level modular data storage system of FIG. 3.

In an alternative embodiment shown in FIG. 4, a modular data storage system 150 may include at least one cartridge access device, e.g., 152, 154, 156, 158 on each level 160, 162, 164, 166, which eliminates the need for an elevator module.

Figure 5:
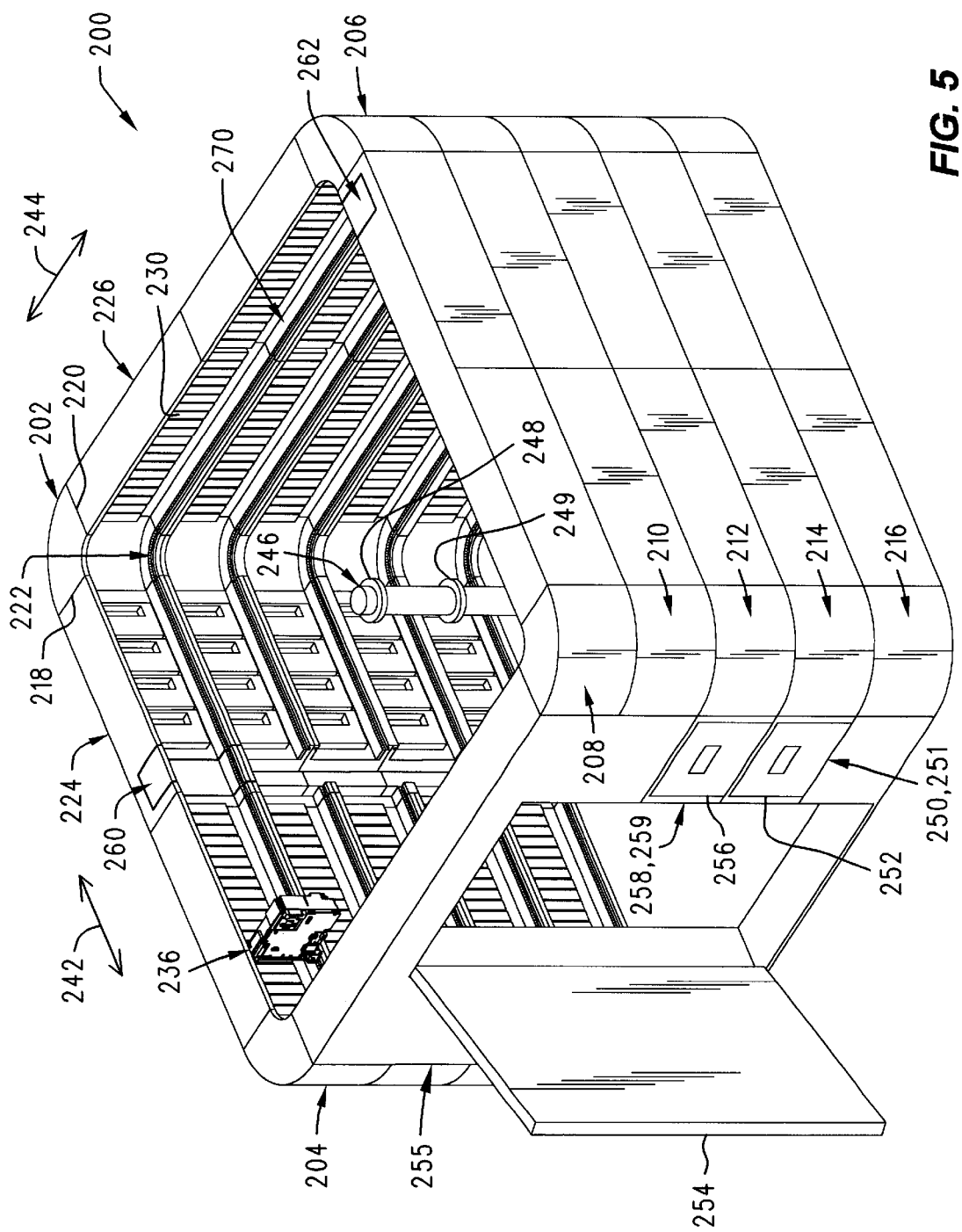
FIG. 5 is an isometric view of a multi-level, rectangular-shaped modular data storage system according to the present invention.

FIG. 5 illustrates a modular data storage system 200 comprising at least one modular corner unit 202, 204, 206, 208, 210, 214, 216. Each modular corner unit, e.g., 202, comprises a first end 210 and a second end 212 and at least two conductive track members, e.g., 214, extending from the first end 210 to the second end 212. The modular corner unit 202 is attachable at its first end 210 to a first modular unit 220 and at its second end 212 to a second modular unit 222. With the modular corner unit 202 attached, the first modular unit 220 and the second modular unit 222 are in a non-parallel orientation. Specifically, a cartridge access device 236 may be translated in a first lateral direction 242 along the modular corner unit 202, which then changes the direction of translation of the cartridge access device 236 to a second lateral direction 244. As shown in FIG. 5, the conductive track members 214 on each modular corner unit are preferably rounded to provide a smooth translation from the first lateral direction 242 to the second lateral direction 244.

Each modular corner unit 202, 204, etc. may perform the singular function of changing the direction of translation of the cartridge access device 236. Alternately, one or more modular corner units 202, 204, 206, 208 may comprise one or more modules such as a power module or an elevator module. Furthermore, one or more modular units or modular corner units may be several levels in height. For example, two or more of the modular corner units 208, 210, 214, 216 shown in FIG. 5 may be integrally formed as a single corner unit that attaches to several levels of modular units. As another example, the elevator module 110 shown FIG. 3 may be four levels in height rather than being divided into sections 120, 122, 124, 126.

As shown in FIG. 5, a cartridge storage system 200 may include several elevator modules 260, 262 to increase the number of paths a cartridge access device 236 may take to a single cartridge (e.g., 230), and to minimize the effects of a stalled cartridge access device 236. If, for example, the cartridge access device 236 was stalled in front of modular unit 226 but not in front of the cartridge 230, another cartridge access device (not shown) could still access the cartridge 230 via one of the elevator modules 260, 262.

As described in '208, the cartridge access device 236 may be controlled by a computer system which sends control signals to the cartridge access device via a wireless communications link. This computer system may be incorporated within a control module 246, FIG. 5. The control module 246 may comprise a plurality of communications devices 248, 249, i.e., one for each level of adjacent modular units, which is adapted to send wireless signals to the cartridge access device 236 at any location within the system 200. Although the control module 246 is represented by a centrally-located tower in FIG. 5, it is to be understood that the control module in the different embodiments of the present invention shown and described herein may be configured in any manner as long as the communication device (s) of the control module are within range of the communications device (37, FIG. 2) on the cartridge access device (s). Furthermore, the components of the control module may be at separate locations within the system, i.e., the communications devices 248, 249 may be mounted on a centrally-located tower as shown in FIG. 5, and linked to a control system as described in '208 which may be incorporated within a modular unit such as one containing drives (e.g., 224).

A modular data storage system 200 which is arranged in a closed geometric configuration like that shown in FIG. 5 may further comprise at least one access door 252, 254, 256. One of the access doors 252 may be integrated into a service module 250, described in further detail below. Another access door 254 may be sized to allow a human or robot to access the area 270 occupied by the modular units (e.g., 224, 226) and the cartridge access device(s) 236. This access door 252 may be integrated into a modular unit 255 which is several levels in height as shown in FIG. 5. Yet another access door 256, commonly called an "I/O (input/output) mailslot", may be adapted to receive a cartridge which the cartridge access device 236 can retrieve from or deposit into a cartridge-receiving device (not shown) just inside the access door 256. The access door 256 may be a component of a mailslot module 258 which may be integrated into a modular unit 259, as shown in FIG. 5, that is attachable to other modular units or corner modular units (e.g., 212). One or more of the access doors 252, 254, 256 may be controlled by the computer system described in '208 via a wireless communications link (not shown). Specifically, each of the access doors 252, 254, 256 may comprise a communications device (not shown) which is configured to receive a wireless signal. In order to protect the modular data storage system 200 and provide more security, an upper panel and a lower panel (not shown) may be provided to completely enclose the area 270 occupied by the modular units (e.g., 224, 226) and the cartridge access device(s) 236.

It is to be understood that any number of modular units or modular corner units may be utilized within a modular data storage system. Furthermore, one or more modular units or modular corner units may be added to the modular data storage system at any time. In addition, a modular data storage system may comprise any number of cartridge access devices. For example, should a cartridge access device fail, other cartridge access devices may be provided which can resume the functions of the failed cartridge access device, and possibly even move the failed cartridge access device to a service module 250, FIG. 5. Alternately, a separate mechanical assembly (not shown) may be provided which is adapted to move a failed cartridge access device to a service module. This assembly may be housed within the service module 250 when it is not in use.

The service module 250 is adapted to receive a cartridge access device 236 and provide access thereto by a human, robot, mechanical device, etc., in order to service the cartridge access device 236. The service module 250 may be adapted to remove the cartridge access device 236 outside the normal path thereof. The cartridge access device 236 may be accessible through an access door 252 in the service module 250, or simply by entering the area 270 where the service module 250 is located. As shown in FIG. 5, the service module 250 may be integrated into a modular unit 251 which is attachable to other modular units or corner modular units. Alternately (not shown), the service module may be integrally formed with one or more other types of modules into a single modular unit.

Figure 6:
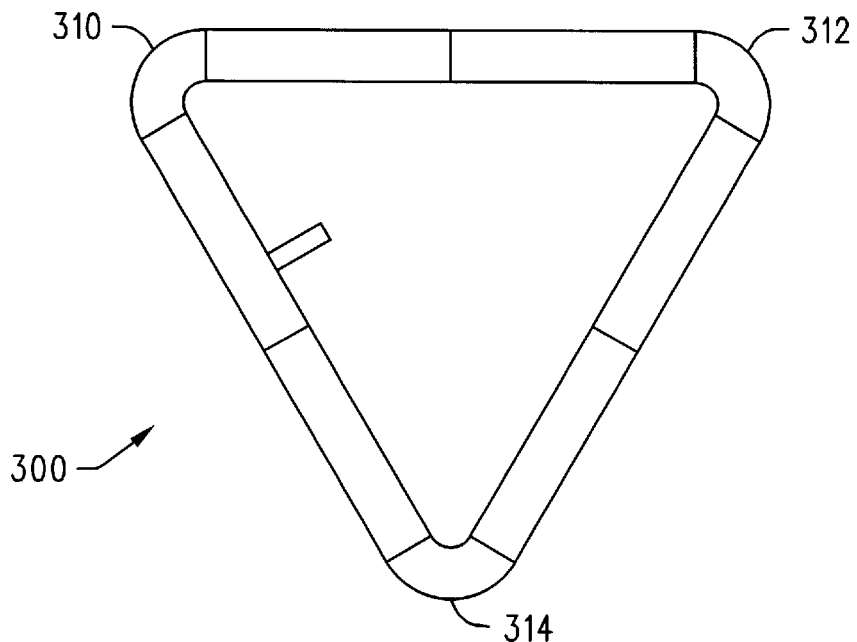
FIG. 6 is a top plan view of a triangular-shaped modular data storage system according the present invention.
Figure 7:
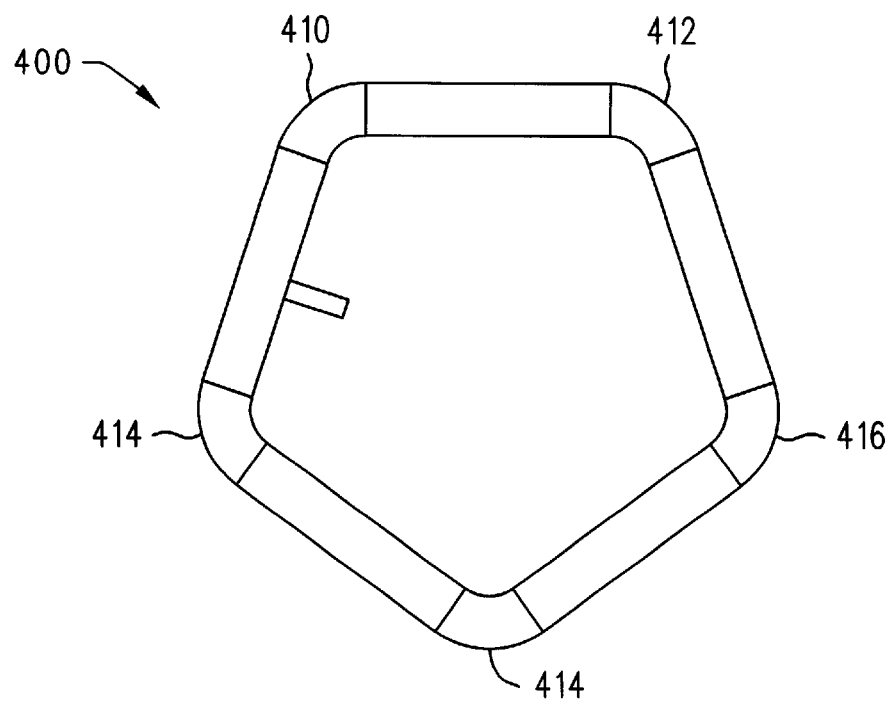
FIG. 7 is a top plan view of a hexagonal-shaped modular data storage system according the present invention.

While the modular units and modular corner units are arranged in a substantially rectangular configuration wherein the first lateral direction 242 is perpendicular to the second lateral direction 244, it is to be understood that the modular units may be arranged in any geometric configuration. For example, as shown in FIG. 3, a modular data storage system 100 may be substantially linear and not comprise any modular corner units. As shown in FIG. 6, a modular data storage system 300 may comprise three modular corner units 310, 312, 314 and have a substantially triangular shape. As shown in FIG. 7, a modular data storage system 400 may comprise five modular corner units 410, 412, 414, 416, 418 and have a substantially hexagonal shape.

Figure 8:
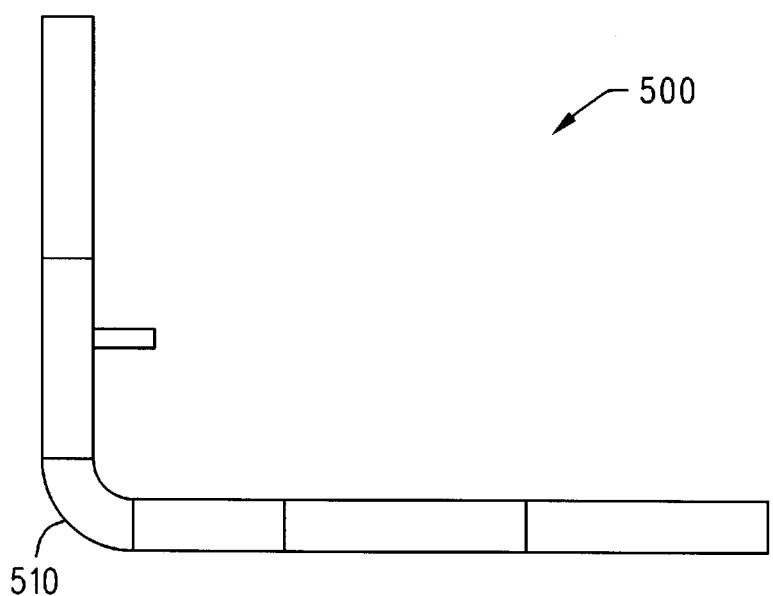
FIG. 8 is a top plan view of an L-shaped modular data storage system according the present invention.
Figure 9:
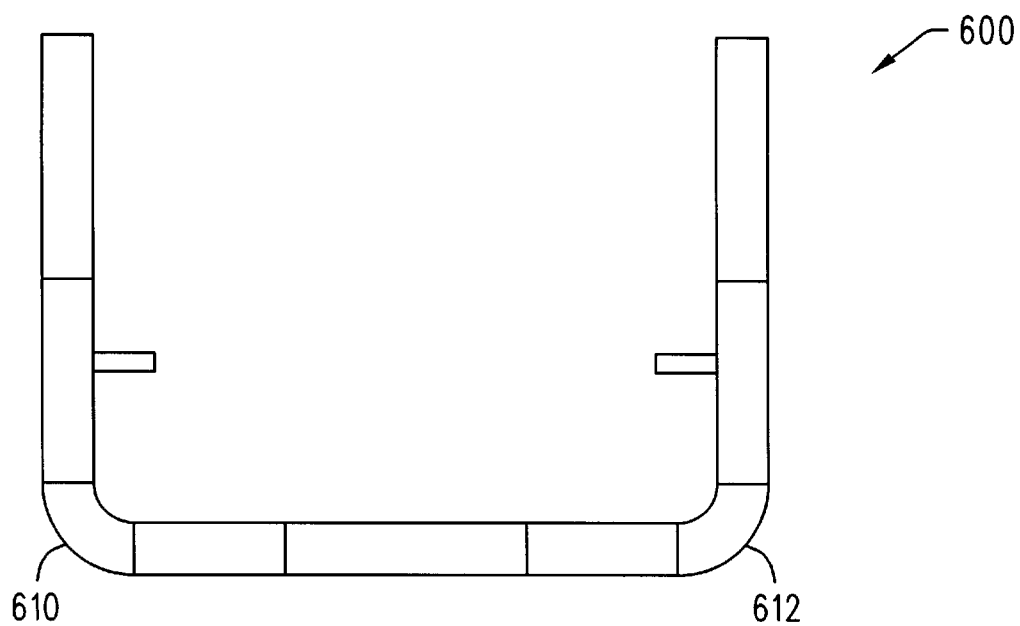
FIG. 9 is a top plan view of a U-shaped modular data storage system according the present invention.

While FIGS. 6 and 7 illustrate closed geometric configurations, the modular units may also be arranged in an open geometric configuration as shown in FIGS. 8–9. For example, as shown in FIG. 8, a modular data storage system 500 may comprise a single modular corner unit 512 and be substantially L-shaped. As shown in FIG. 9, a modular data storage system 600 may comprise two modular corner units 612, 614 and be substantially U-shaped. Each of the modular data storage systems shown and described above may comprise any number of adjacent modular units and any number of levels thereof.

It can be seen from the above description that any number of modular units can be combined to form data storage systems of varying size and capacity for low-end, mid-range, or high-end customers. Since modular units and cartridge access devices may be added to the system at any time, the cost and inconvenience of expanding the size of a system is greatly reduced. By utilizing a wireless cartridge access device such as that described in '208, the need for carrying power and signal control devices and cables therefor along with the cartridge access device while it is being translated throughout the system is eliminated. As a result, a plurality of cartridge access devices may be utilized within the system, and the areas to which each cartridge access device may be translated is greatly increased, only being limited by the range of the wireless signals. Thus, the system may be large enough to fill a room, or an entire warehouse, with modules and cartridge access devices. It is contemplated that the modular data storage system of the present invention may be configured as a long-term storage warehouse for data cartridges and the like, at a much lower cost than current long-term storage warehouses.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A modular data storage system for handling and storing cartridges, comprising:

a) a plurality of modular units, each of said modular units being attachable to one another to form adjacent modular units, said plurality of modular units comprising a plurality of conductive track members, wherein at least two of said conductive track members having a voltage potential therebetween extend laterally across each of said modular units;

b) at least one cartridge access device adapted to retrieve a cartridge and transfer said cartridge to another location, said cartridge access device having at least two conductive engaging members which are adapted to contact said conductive track members and provide electrical power to said cartridge access device; and c) wherein said conductive track members of said adjacent modular units are in electrical contact with one another and are substantially in alignment and positioned adjacent one another such that each of said conductive engaging members remains in contact with at least one of said conductive track members as said cartridge access device is translated laterally among said adjacent modular units.

2. The modular data storage system of claim 1 wherein at least one of said modular units comprises a cartridge-receiving module which is adapted to receive a plurality of said cartridges.

3. The modular data storage system of claim 1 wherein at least one of said modular units comprises a power module which supplies electrical current to said conductive track members in said adjacent modular units.

4. The modular data storage system of claim 1 wherein at least one of said modular units comprises a service module adapted to receive and provide access to said cartridge access device in order to service said cartridge access device.

5. The modular data storage system of claim 1 wherein said cartridge access device is adapted to receive a wireless signal, and further comprising a control module adapted to communicate with said cartridge access device via said wireless signal.

6. The modular data storage system of claim 1 further comprising:
   a) a plurality of gear racks, wherein at least one of said gear racks extends laterally across each of said modular units;
   b) at least one pinion gear attached to said cartridge access device which is adapted to engage said gear racks;
   c) wherein said gear racks are substantially in alignment and positioned adjacent one another such that said cartridge access device may be translated laterally among said adjacent modular units.

7. The modular data storage system of claim 1 wherein said adjacent modular units are stacked vertically upon one another to form a plurality of levels of adjacent modular units.

8. The modular data storage system of claim 7 wherein each of said levels of adjacent modular units comprises said at least one cartridge access device.

9. The modular data storage system of claim 7 wherein at least one of said modular units comprises an elevator module which is adapted to receive said cartridge access device and vertically translate said cartridge access device among said plurality of levels of adjacent modular units.

10. A modular data storage system for handling and storing cartridges, comprising:
    a) a plurality of modular units, each of said modular units being attachable to one another to form adjacent modular units, said plurality of modular units comprising a plurality of conductive track members, wherein at least two of said conductive track members having a voltage potential therebetween extend laterally across each of said modular units;
    b) at least one modular corner unit comprising a first end and a second end and at least two conductive track members having a voltage potential therebetween extending from said first end to said second end, said modular corner unit being attachable at said first end to a first of said modular units and at said second end to a second of said modular units such that said first of said modular units and said second of said modular units are in a linear, non-parallel orientation;
    c) at least one cartridge access device for receiving a cartridge and transferring said cartridge to another location, said cartridge access device having at least two conductive engaging members which are adapted to contact said conductive track members and provide electrical power to said cartridge access device; and
    d) wherein said conductive track members of said adjacent modular units and said modular corner unit are in electrical contact with one another and are substantially in alignment and positioned adjacent one another such that each of said conductive engaging members remains in contact with at least one of said conductive track members as said cartridge access device is translated laterally among said adjacent modular units and said modular corner unit.

11. The modular data storage system of claim 10 wherein at least one of said modular units comprises a cartridge-receiving module which is adapted to receive a plurality of said cartridges.

12. The modular data storage system of claim 10 wherein at least one of said modular units comprises a power module which supplies electrical current to said conductive track members.

13. The modular data storage system of claim 10 wherein at least one of said modular units comprises a service module adapted to receive and provide access to said cartridge access device in order to service said cartridge access device.

14. The modular data storage system of claim 10 wherein said cartridge access device is adapted to receive a wireless signal, and further comprising at least one control module adapted to communicate with said cartridge access device via said wireless signal.

15. The modular data storage system of claim 10 further comprising:
    a) a plurality of gear racks, wherein at least one of said gear racks extends laterally across each of said modular units;
    b) at least one pinion gear attached to said cartridge access device which is adapted to engage said gear racks;
    c) wherein said gear racks are substantially in alignment and positioned adjacent one another such that said cartridge access device may be translated laterally among said adjacent modular units.

16. The modular data storage system of claim 10 wherein said adjacent modular units and said at least one corner unit are stacked vertically upon one another to form a plurality of levels of adjacent modular units.

17. The modular data storage system of claim 16 wherein each of said levels of adjacent modular units comprises said at least one cartridge access device.

18. The modular data storage system of claim 16 wherein at least one of said modular units comprises an elevator module which is adapted to vertically translate said cartridge access device among said plurality of levels of adjacent modular units.

19. The modular data storage system of claim 16 further comprising a plurality of modular corner units and at least one access door, wherein said modular units, said modular corner units, and said at least one access door are arranged in a closed geometric configuration.

20. The modular data storage system of claim 19 further comprising an upper panel and a lower panel, forming a completely enclosed area that is accessible through said at least one access door.

* * * * *

(12) EX PARTE REEXAMINATION CERTIFICATE (5013th)
United States Patent
Luffel et al.

(10) Number: US 6,222,699 C1
(45) Certificate Issued: *Nov. 2, 2004

(54) MODULAR DATA STORAGE SYSTEM UTILIZING A WIRELESS CARTRIDGE ACCESS DEVICE

(75) Inventors: Robert W. Luffel, Greeley, CO (US); Gregg S. Schmidtke, Fort Collins, CO (US)

(73) Assignee: Hewlett-Packard Company, Palo Alto, CA (US)

Reexamination Request:
No. 90/006,144, Nov. 13, 2001

Reexamination Certificate for:
Patent No.: 6,222,699
Issued: Apr. 24, 2001
Appl. No.: 09/321,142
Filed: May 27, 1999

(*) Notice: This patent is subject to a terminal disclaimer.

Related U.S. Application Data

(63) Continuation-in-part of application No. 09/143,208, filed on Aug. 28, 1998, now abandoned.

(51) Int. Cl.$^7$ .............................................. G11B 15/68
(52) U.S. Cl. ...................................................... 360/92
(58) Field of Search ................................ 360/92, 98.04, 360/98.06; 369/30.06, 30.39, 30.69, 191, 30.34, 178.01, 231, 233, 258, 261, 30.01–30.09

(56) References Cited

U.S. PATENT DOCUMENTS 5,206,845 A    4/1993   Baxter et al. ................. 369/34
5,940,356 A  * 8/1999   Toumbas .................. 369/30.39
6,262,863 B1 * 7/2001   Ostwald ....................... 360/92

FOREIGN PATENT DOCUMENTS

EP          982722 A2     3/2000
EP          982723 A2     3/2000

* cited by examiner

*Primary Examiner*—A. J. Heinz

(57) ABSTRACT

A modular data storage system for handling and storing data cartridges which may comprise a plurality of modular units which are attachable to one another to form adjacent modular units. Conductive track members extend laterally across the modular units. The modular data storage system may further comprise at least one wireless cartridge access device for receiving a cartridge and transferring it to another location. The system may further comprise at least one modular corner unit which is attachable to modular units at each end thereof. The adjacent modular units and corner unit(s) may be stacked vertically upon one another to form a plurality of levels of adjacent modular units. At least one of the modular units may comprise a cartridge-receiving module, a power module which supplies electrical current to the conductive track members, a service module adapted to receive and provide access to a cartridge access device in order to service the cartridge access device, a control module which communicates with the cartridge access device via a wireless signal, or an elevator module adapted to vertically translate the cartridge access device among the levels of adjacent modular units. The modular data storage system may be arranged in a closed geometric configuration and comprise at least one access door thereto. The system may further comprise an upper panel and a lower panel, forming a completely enclosed area that is accessible through the access door(s).

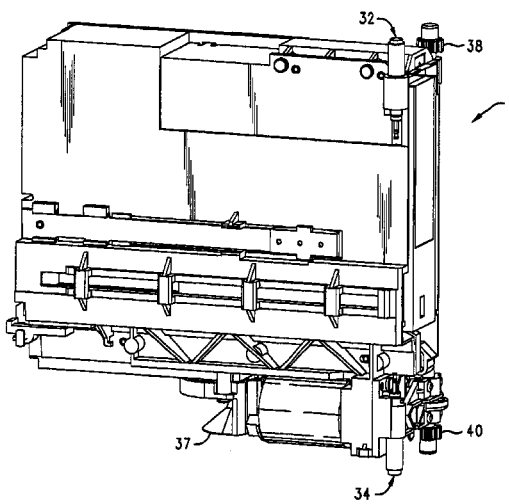

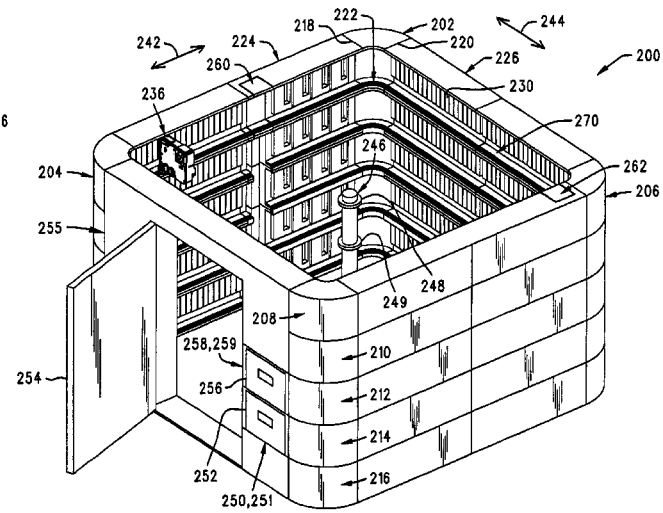

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–20 is confirmed.

Claims 1–8 and 9 are cancelled.

\* \* \* \* \*